United States Patent [19]

Garrett

[11] Patent Number: 4,509,762
[45] Date of Patent: Apr. 9, 1985

[54] STATIONARY ASSEMBLY FOR MECHANICAL SHAFT SEAL

[75] Inventor: Keith C. Garrett, Shipley, England

[73] Assignee: AES Engineering Limited, South Yorkshire, England

[21] Appl. No.: 509,379

[22] Filed: Jun. 30, 1983

[30] Foreign Application Priority Data

Jul. 1, 1982 [GB] United Kingdom ............. 8219023

[51] Int. Cl.³ ............................................. F16J 15/34
[52] U.S. Cl. ................................. 277/81 R; 277/41; 277/93 SD
[58] Field of Search ..................... 277/38–41, 277/44, 45, 81 R, 81 S, 81 P, 82, 83, 85, 86, 91, 93 R, 93 SD

[56] References Cited

U.S. PATENT DOCUMENTS

| 2,091,485 | 8/1937 | Panzegrau | 277/81 X |
| 2,252,526 | 8/1941 | Shenton | 277/91 |
| 2,701,154 | 2/1955 | Dolhun | 277/41 |
| 2,996,319 | 8/1961 | Copes | 277/81 S X |
| 3,116,066 | 12/1963 | Koppius | 277/93 SD X |
| 3,356,377 | 12/1967 | Voitik | 277/40 |
| 3,529,838 | 9/1970 | Singleton | 277/91 X |
| 3,715,169 | 2/1973 | Molis | 277/81 R X |
| 4,145,059 | 3/1979 | Imai et al. | 277/81 R |
| 4,214,764 | 7/1980 | Fava | 277/93 SD |
| 4,305,592 | 12/1981 | Peterson | 277/93 R X |

FOREIGN PATENT DOCUMENTS 699001 12/1964 Canada ........................ 277/93 R Primary Examiner—Robert S. Ward
Attorney, Agent, or Firm—Brooks & Kushman

[57] ABSTRACT

A stationary assembly for a balanced mechanical shaft seal comprises a first annular member for surrounding the shaft and attachable to the housing, a second annular member having a radial face for mating with a radial face of the rotary assembly, and third annular member between the first and second member, the arrangement being such that relative pivotal movement is permitted about a first axis between said first and second members and about a second axis at right angles to the first axis between the second and third members, such movement resulting in no axial force being exerted between the members by any spring of the stationary assembly.

6 Claims, 3 Drawing Figures

STATIONARY ASSEMBLY FOR MECHANICAL SHAFT SEAL

This invention relates to mechanical shaft seals and in particular to the so called stationary assembly for a balanced mechanical shaft seal.

A balanced mechanical shaft seal may typically comprise a rotary assembly for attachment to the shaft and a stationary assembly for attachment to a housing surrounding the shaft. The stationary and rotary assemblies are provided with mating sealing faces which together form a seal between the assemblies. Each assembly may also include a further portion, carrying its respective above mentioned mating sealing face and also being in sealing engagement with its associated fixed portion. This separation of the fixed portion of each assembly from the seal face carrying portion allows the latter to be given a limited amount of movement to accommodate misalignment and/or the effects of wear during use of the seal. The above mentioned further portions of the stationary and rotary assemblies have been referred to as floating portions.

Such a seal may be arranged so as to be "hydraulically balanced" so that the forces acting on each side of the seal between the stationary and rotary assemblies are maintained at a level sufficient to urge the sealing faces into contact with each other but not with any substantial forces therebetween. In this way the excessive forces which would otherwise be present between the rotary and stationary assemblies are kept to a minimum.

Mechanical shaft seals have been proposed in which the stationary and rotary assemblies are each provided with floating portions and each assembly is provided with springs acting between the fixed and floating portions in order to urge the latter towards each other. The provision of these springs allows the floating portions to compensate for any deviation of the shaft from a perpendicular relationship to the housing and at the same time provides a considerable degree of accommodation for axial wear at the engaging rotary and stationary assembly faces during operation of the device.

It has now been surprisingly discovered that sufficient axial accommodation can be provided without the requirement for two sets of springs, one set located in the rotary assembly and the other set in the stationary assembly. It has been found that the single set of springs located in the rotary assembly will provide adequate axial accommodation. Means provided in the stationary assembly allowing relative pivotal or rocking movement between the floating and fixed portions but not in themselves urging the floating portion relatively away from the fixed portion provide an unexpected advantage over the known seal incorporating two sets of springs as aforementioned. The presence of springs results in uneven forces exerted between the floating and fixed parts of each assembly when relative pivoting between these parts takes place. This causes uneven and indeed faster wear than would occur if the parts were perfectly aligned. However the provision of an arrangement allowing relative pivoting of the floating and fixed parts but without forces exerted therebetween by any spring of the stationary assembly means that there are no uneven forces between these parts even when not perfectly aligned and the problems associated with wear are significantly reduced.

According to the present invention there is provided a stationary assembly for a balanced mechanical shaft seal for sealing a rotatable shaft to a fixed housing, said seal including a rotary assembly with a radial face and a stationary assembly, the stationary assembly comprising a first annular member for surrounding the shaft and attachable to the housing, a second annular member having a radial face for mating with said radial face of the rotary assembly, and a third annular member between said first and second members, the arrangement being such that relative pivotal movement is permitted about a first axis between said first and third members and about a second axis at right angles to the first axis between said second and third members, said pivotal movement between members being without any axial forces being exerted between said members by any spring of the stationary assembly.

By pivotal movement is meant movement involving no overall axial movement but a movement about any axis at right angles to the longitudinal axis of the members and passing through or close to said longitudinal axis.

Preferably mounting means are located between said first and third members and also between said second and third members, said mounting means spacing said third member from each of said first and second members. Said mounting means may, for instance, be projections extending from one of said first and third members and locating in recesses located in the other of said first and third members. Similar mating projections and recesses may be provided between said second and third members. By way of example a pair of diametrically opposed pins may be fixed in the first member and locating in corresponding recesses located in the third member. The second pair of diametrically opposed pins, offset by 90° from the first mentioned pair of pins, may be fixed in the second member and locate in corresponding recesses in the third member. The first mentioned pair of pins allows pivotal or rocking movement about one axis between the first and third members and the second pair of pins allows pivotal movement about an axis at right angles to the first mentioned axis between the second and third members. The overall effect is limited pivotal rocking movement about any axis at right angles to the longitudinal axis of the assembly. The movement may be described as a sort of "universal joint" movement.

In other related embodiments in accordance with the present invention the pins may be replaced by integral projections such as triangular cross section projections mating in corresponding triangular cross section recesses in the other appropriate member.

The present invention also provides a mechanical shaft seal comprising rotary and stationary assemblies, the stationary assembly being according to the invention.

An embodiment of the present invention will now be described by way of example only, and with reference to the accompanying drawings, in which.

Figure 1:
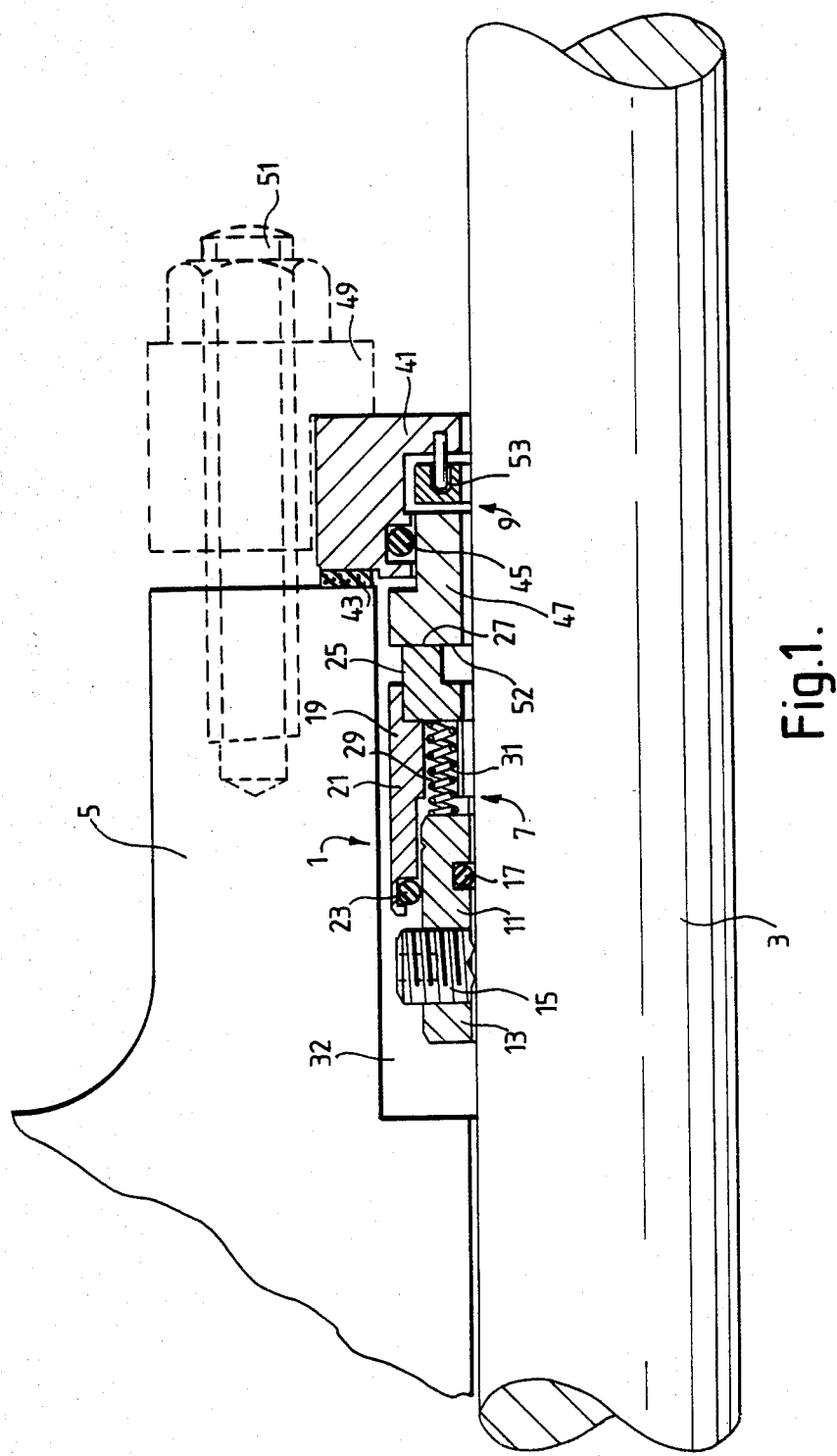
FIG. 1 illustrates a mechanical shaft seal in accordance with the invention which is shown in longitudinal section.

Referring to the drawings a balanced mechanical shaft seal is shown generally at 1 and provides sealing between a shaft 3 and a housing, such as pump housing, 5. The seal 1 comprises a rotary assembly 7 and a stationary assembly 9. Each assembly includes fixed and floating portions.

Rotary assembly 7 includes a fixed portion 11 the latter comprising an annular ring 13 which is fixed to shaft 3 by means of grub screws 15. The fixed portion 11 is provided with an annular sealing ring 17 which bears directly against shaft 3.

The floating portion 19 of the rotary assembly 7 includes annular ring 21 which is sealed to ring 13 of the fixed portion 11 by means of rubber O-ring 23 located near that end of ring 21 remote from stationary assembly 9. Attached to the other end of ring 21 is an L-section rotary ring 25 which carries radial sealing face 27. Extending through ring 21 between seal ring 25 and ring 13 are a plurality of circumferentially spaced apart bores 29. Located within each bore 29 is a compression spring 31 which abuts at one end against a radial end face of ring 13 and at the other end against seal ring 25 thereby urging floating portion 19 and seal ring 25 away from fixed portion 11 and, in consequence, sealing face 27 is urged against the corresponding sealing face of the stationary assembly. The rotary assembly 7 is located within an annular stuffing box 32 in the housing 5. The design, including the dimensions of the floating portion 19 of the rotary assembly 7, is such that the forces within the stuffing box 32 due to the pressure of the fluid therein are balanced in their action on floating member 19 in directions towards and away from the stationary assembly 9. By 'balanced' it is not intended to imply that the forces in each direction exactly cancel each other out. Rather they are arranged so that there is a net resultant force towards stationary assembly 9 but this force is much less than would be the case if the design was such that there were no counter-acting forces in the opposite direction by any spring of the stationary assembly.

Stationary assembly 9 includes a fixed portion 41 which is in the form of an annular ring carrying a gasket 43 to seal it against housing 5 and an O-ring 45 to seal it against floating portion 47 of the stationary assembly 9. Ring 41 is clamped against the housing 5 by means of clamping member 49 and a plurality of nuts and bolts 51.

The floating portion 47 of stationary assembly 9 is also in the form of an annular ring and it extends from a position within ring 41 against which it is sealed by the above mentioned O-ring 45 to its other end which is in the form of an annular sealing face 52 which bears against the sealing face 27 of ring 25.

Figure 2:
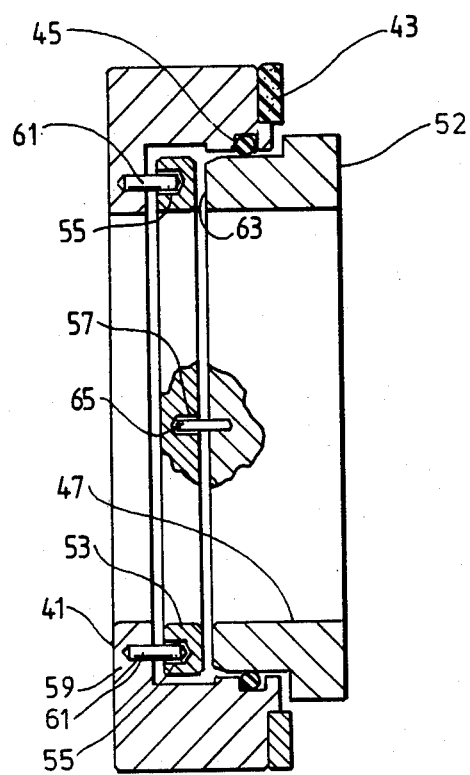
FIG. 2 is a longitudinal section through a stationary assembly similar to that forming part of the mechanical shaft seal of FIG. 1.

Between rings 41 and 47 there is located an intermediate ring 53. This intermediate ring 53 is shown more clearly in FIG. 2. The ring 53 is provided with two pairs 55 and 57 of recesses. Recesses 55 are disposed diametrically opposite each other and their openings on a radial face of ring 53 face towards radially inwardly extending flange 59 of ring 41. Flange 59 is in turn provided with a pair of diametrically opposed pins 61 which extend out from the flange in a direction parallel to the longitudinal axis of the assembly and the free ends of which are received as a loose fit in corresponding recesses 55. The relative lengths of recesses 55 and the portions of pins 61 extending from flange 59 is such that with the ends of pins 61 bearing against the closed ends of recesses 55 there is a small gap between intermediate ring 53 and flange 59.

Recesses 57 are diametrically opposed and their open ends face towards radial face 63 of ring 47. Recesses 57 are offset by 90° from the above mentioned recesses 55. Ring 47 is provided with pins 65 which are similar to those pins 61 which extend from flange 59 of ring 41. Pins 65 locate in a loose fit in recesses 57 and the lengths of the pins and the recesses are such that, with the ends of the pins abutting against the closed ends of the recesses, there is a small gap between ring 53 and ring 47.

Accordingly it can be seen that ring 47 is anchored to the clamped ring 41 by means of the intermediate ring 53 and the engagement of the two pairs of pins in their associated recesses. At the same time intermediate ring 53 is able to pivot or rock about an axis passing through pins 61 and the longitudinal axis of the assembly. Furthermore intermediate ring 53 and ring 47 are able to rock or pivot relative to each other about an axis passing through pins 65 and the longitudinal axis of the assembly. As a result ring 47, carrying sealing face 52, is able to rock or pivot about any axis perpendicular to the longitudinal axis of the assembly and relative to the clamped ring 41. In this way, ring 47 is able to adjust itself to any lack of perpendicularity between the shaft 3 and the clamped ring 41. At the same time the absence of any spring means between ring 47 and clamped ring 41 means that any such relative pivoting between these rings will not result in uneven forces being applied to ring 47 and hence to the sealing faces 27 and 52. Accordingly the wearing forces to which these faces are exposed will be no greater than is the case when there is perfect perpendicularity of clamped ring 41 to shaft 3. Any wearing of the faces or indeed any other mechanism as a result of which the longitudinal distance between fixed portion 11 of rotary assembly 7 and clamped ring 41 of stationary assembly 9 is caused to change, can be easily accommodated by springs 31 acting on floating portion 19 of rotary assembly 7.

Figure 3:
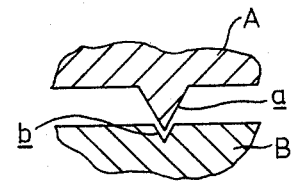
FIG. 3 is a sectional view illustrating a modification of the invention.

FIG. 3 illustrates a modification of the invention in which a portion A of one of the rings 41, 47, or 53 has an integral projection a, this ring also having another unknown diametrically opposed projection, both of which have a triangular cross-section. These triangular projections are respectively received within mating recesses b also of triangular cross-section in one of the adjacent rings. Another set of like ring integral triangular projections and mating triangular recesses are located at 90° with respect to the first set of projections and recesses to support the ring 47 for pivoting movement in the same manner as the previously described embodiment.

I claim:

1. A stationary assembly for a balanced mechanical shaft seal for sealing a rotatable shaft to a fixed housing, said seal including a rotary assembly with a radial face and also including a stationary assembly, the stationary assembly comprising a first annular member for surrounding the shaft and attachable to the housing, a second annular member having a radial face for mating with said radial face of the rotary assembly, a third annular member between said first and second members, and mounting means for permitting relative pivotal movement about a first axis between said first and third members and about a second axis at right angles to the first axis between said second and third members, said pivotal movement between members being without any axial forces being exerted between said members by any spring of the stationary assembly.

2. A stationary assembly according to claim 1 in which mounting means are located at diametrically opposed locations between said first and third members and also at diametrically opposed locations between said second and third members, said mounting means spacing said third member from each of said first and second members.

3. A stationary assembly according to claim 2, in which the mounting means located at diametrically opposed locations between each pair of members to be spaced comprises projections extending from one of said members of each pair of members, and recesses in the other of said members of each pair, said projections being received within associated recesses.

4. A stationary assembly according to claim 3, in which said projections are a first pair of diametrically opposed pins extending between said first and third members and another pair of diametrically opposed pins extending between said second and third members.

5. A stationary assembly according to claim 4, in which the projections comprise integral triangular cross-section projections, and the recesses being of triangular cross-section for receiving the triangular projections.

6. A stationary assembly in accordance with any one of the preceding claims, and further including a rotary assembly for cooperating with the stationary assembly to provide a shaft seal.

* * * * *